United States Patent [19]
Yamada et al.

[11] Patent Number: 5,803,846
[45] Date of Patent: Sep. 8, 1998

[54] CONTINUOUSLY VARIABLE TRANSMISSION WITH MOVABLE FLANGE

[75] Inventors: Masahiko Yamada, Saya; Makoto Imaida, Zama; Kiyofumi Tanaka, Machida, all of Japan

[73] Assignees: Nissan Motor Co., Ltd., Yokohama; Aichi Machine Industry Co., Ltd., Nagoya, both of Japan

[21] Appl. No.: 583,601

[22] Filed: Jan. 5, 1996

[30] Foreign Application Priority Data

Jan. 10, 1995 [JP] Japan ................................. 7-001860

[51] Int. Cl.⁶ .................................................. F16H 61/00
[52] U.S. Cl. ................................................ 474/18; 474/28
[58] Field of Search .............................. 474/11, 12, 17, 474/18, 27, 28

[56] References Cited

U.S. PATENT DOCUMENTS

| | | | |
|---|---|---|---|
| 4,674,359 | 6/1987 | Hattori | 74/745 |
| 4,861,317 | 8/1989 | Brasse et al. | 474/11 |
| 5,073,147 | 12/1991 | Takano et al. | 474/28 |
| 5,085,107 | 2/1992 | Tatara | 74/866 |
| 5,439,419 | 8/1995 | Yamada et al. | 474/18 |

*Primary Examiner*—Roger J. Schoeppel
*Attorney, Agent, or Firm*—Foley & Lardner

[57] ABSTRACT

A continuously variable transmission includes a main shaft having a stepped portion in the vicinity of an end thereof, stationary and movable flanges, and a stopper for preventing a movement of the movable flange. The stepped portion of the main shaft, an end of the movable flange, and the stopper cooperate to define a space around the main shaft.

4 Claims, 3 Drawing Sheets

CONTINUOUSLY VARIABLE TRANSMISSION WITH MOVABLE FLANGE

BACKGROUND OF THE INVENTION

The present invention relates generally to a continuously variable transmission that ensures a shifting by changing a distance between a stationary flange and a movable flange and more particularly, to the movable flange.

A conventional continuously variable transmission with a movable flange is disclosed, for example, in JP-A 6-221395 (=U.S. Pat. No. 5,439,419).

Referring to FIG. 1, this continuously variable transmission comprises a main shaft 1 having a stationary or first flange (not shown), a movable or second flange 3 supported on the main shaft 1 through a ball spline 2, and a stopper 4 for restricting a movement of the movable flange 3. The main shaft 1 and the movable flange 3 are formed with hydraulic passages 5, 6, and the movable flange 3, a piston member 7, and a cylinder member 8 cooperate to define a hydraulic chamber 9.

A distance between the movable flange 3 and the stationary flange is changed by axially moving the movable flange 3 forward/backward by supplying/discharging hydraulic fluid to/from the hydraulic chamber 9 through the hydraulic passages 5, 6.

As for the conventional continuously variable transmission, when mounting a snap ring 10 for restricting a motion of balls 2a of the ball spline 2, the movable flange 3 should be drawn up to an end of the main shaft 1 to the extent that the balls 2a of the ball spline 2 are not disengaged. As the movable flange displacement is dependent on the basis of this drawing amount, the movable flange 3 has the disadvantage of having a longer displacement than necessary, making it difficult to reduce the size of the continuously variable transmission.

Referring to FIG. 2, the minimum length L of the movable flange 3 arranged with respect to the main shaft 1 thereof as shown in FIG. 2 is obtained as follows.

Suppose length of a snap ring groove 10+length from a shaft end of the movable flange 3 to the snap ring groove is L1; the diameter of the total balls of the ball spline 2+moving amount of the ball spline 2+required clearance (L3) is L2; required clearance for producing no disengagement of the balls 2a of the ball spline 2 is L3; moving amount of the movable flange 3 is L4; and required contact length is L5, the minimum length L is given by the following formula:

$$L = L1 + L2 + L3 + L4 + L5 \quad (1)$$

On the other hand, when mounting the snap ring 10, the following drawing amount of the movable flange 3 should be ensured before mounting the stopper 4: L1+α (α: margin determined in consideration of a mounting error).

In order to ensure, under these conditions, the required clearance L3 for producing no disengagement of the balls 2a of the ball spline 2, the length L2−L3 corresponding to the moving amount of the ball spline 2 should be increased by L1+α. As a result, the length of the movable flange 3 is greater than the minimum length L given by the formula (1).

It is, therefore, an object of the present invention to provide a continuously variable transmission wherein the length of a movable flange can be determined without considering a snap ring mounted.

SUMMARY OF THE INVENTION

According to the present invention, there is provided a continuously variable transmission, comprising:

a main shaft having a stepped portion in the vicinity of an end thereof;

a first flange integrated with said main shaft, said first flange having a first face;

a second flange axially movably supported on said main shaft, said second flange having a second face facing said first face of said first flange, an interval between said first face of said first flange and said second face of said second flange being changed by movement of said second flange to achieve a continuous shifting; and a stopper arranged on said main shaft in the vicinity of an end thereof, said stopper contacting an end of said second flange to prevent a movement thereof, said stepped portion of said main shaft, said end of said second flange and said stopper cooperating to define a space around said main shaft.

DETAILED DESCRIPTION OF THE INVENTION

Figure 1:
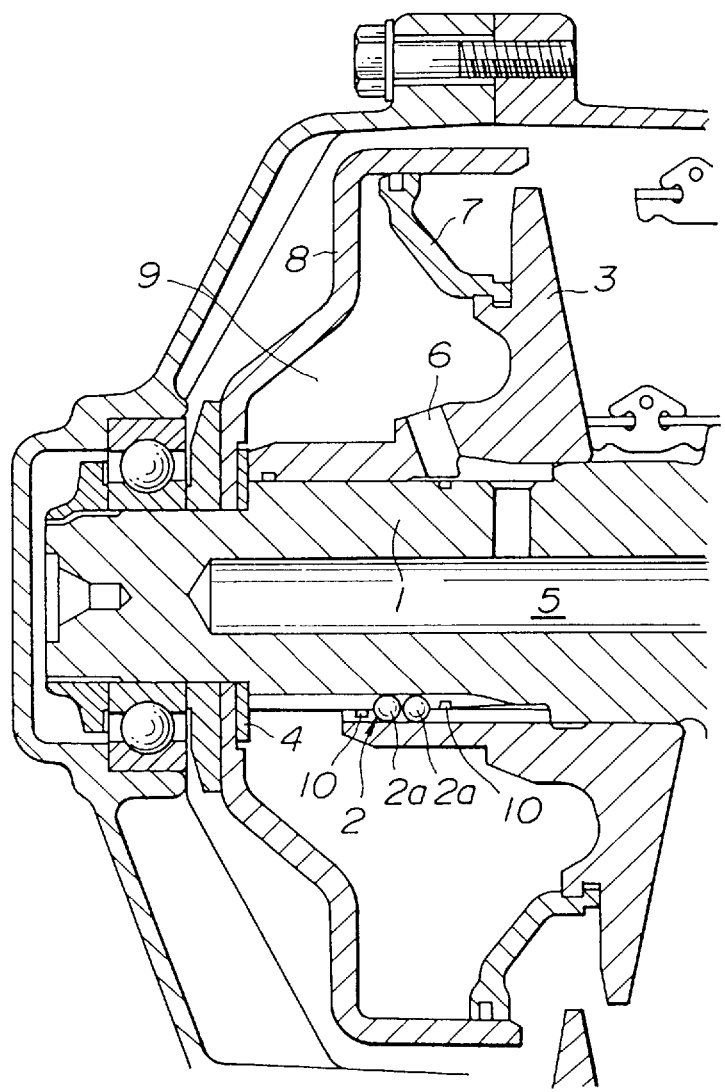
FIG. 1 is a sectional view showing a conventional continuously variable transmission.

Referring to the drawings, a preferred embodiment of a continuously variable transmission with a movable flange will be described.

Figure 3:
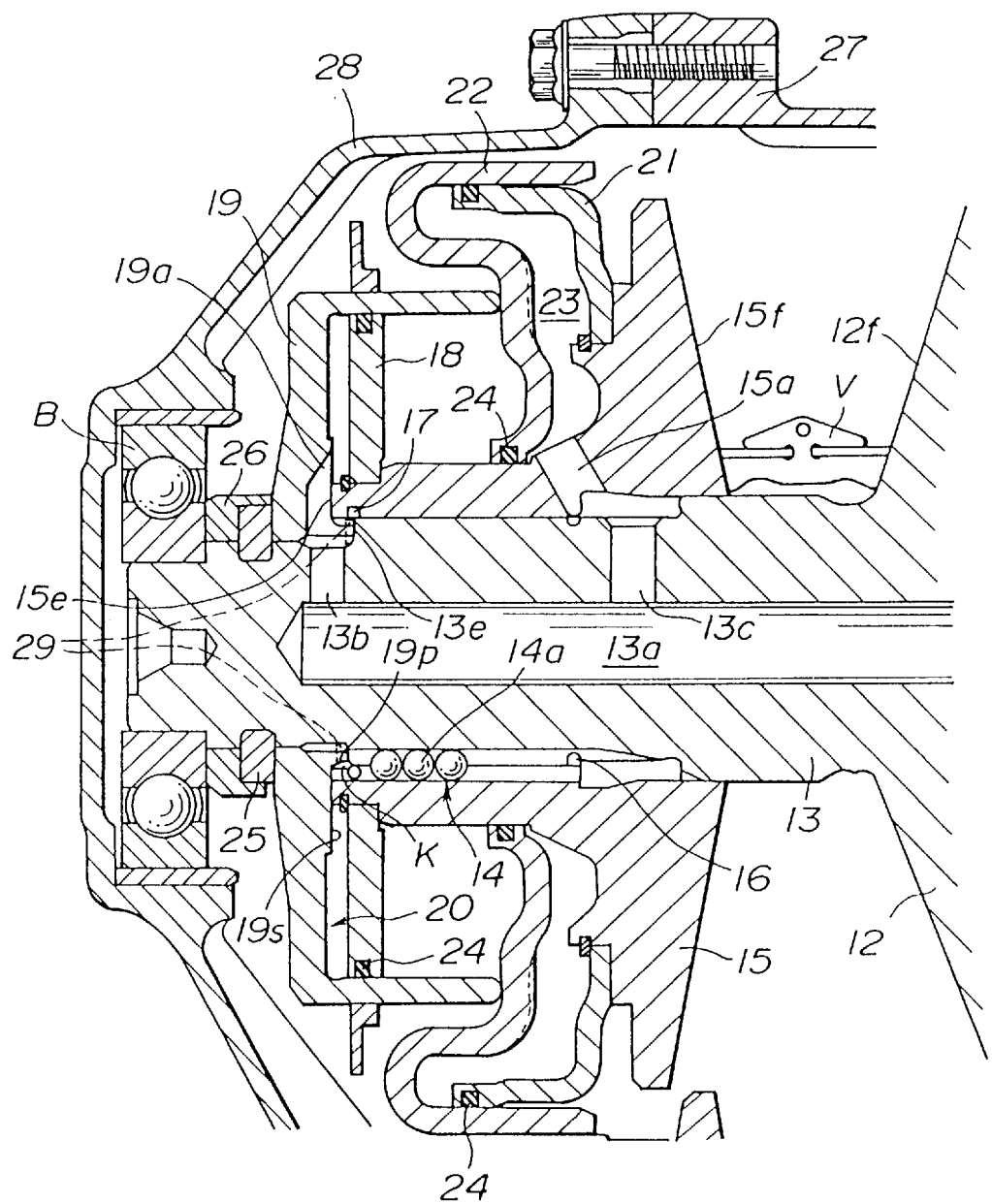
FIG. 3 is a view similar to FIG. 1, showing a preferred embodiment of a continuously variable transmission with a movable flange.

Referring to FIG. 3, a continuously variable transmission includes a stationary flange 12 and a main shaft 13 integrated therewith and connected to a drive shaft, not shown. A movable flange 15 is supported to the main shaft 13 through a ball spline 14. A first flange face 12f of the stationary flange 12 and a second flange face 15f of the movable flange 15 cooperate to hold and support a V-shaped belt V as a transmission element.

Snap rings 16, 17 for restricting a motion of balls 14a of the ball spline 14 are mounted to the main shaft 13 and an inner peripheral portion of the movable flange 15 so as to prevent a disengagement of the balls.

A first piston member 18 is integrated with a first outer peripheral portion of the movable flange 15. A first cylinder member 19 is formed in a cylinder having an opening on one side thereof, and has an inner peripheral portion engaged with the main shaft 13, and an outer peripheral portion with an inside engaged with the first piston member 18.

A first hydraulic chamber 20 is defined by the first piston member 18, the first cylinder member 19, and the main shaft 13.

A second piston member 21 is integrated with a second outer peripheral portion of the movable flange 15. A second cylinder member 22 is engaged with an outer peripheral portion of the second piston member 21. An outer peripheral surface of the movable flange 15 is constructed to be slidable on an inner peripheral portion of the second cylinder member 22.

A second hydraulic chamber 23 is defined by the second piston member 21, the second cylinder member 22, and the movable flange 15. Sealing members 24 are arranged on the outer peripheral portions of the first and second piston members 18, 21, and on the inner peripheral portion of the second cylinder member 22. Reference numerals 25, 26 designate positioning members interposed between the first cylinder member 19 and a bearing B, and 27, 28 designate housings.

The main shaft 13 is formed with hydraulic passages 13a, 13b, 13c, and the first cylinder member 19 is formed with a hydraulic passage 19a, and the movable flange 15 is formed with a hydraulic passage 15a. By suitably supplying hydraulic fluid to the first and second hydraulic chambers 20, 23, an interval of a V-shaped groove defined by the flange face 12f of the stationary flange 12 and the flange face 15f of the movable flange 15 is changed to produce a movement of the V-shaped belt V along the flange faces 12f, 15f, thus varying the speed ratio continuously.

On the side of the opening of the first cylinder member 19, a stopper 19s is integrated with a wall that is vertical with respect to an axis of the main shaft 13, and a protrusion 19p is arranged on an inner peripheral portion, so that when the interval of the V-shaped groove is maximum, the movable flange 15 is stopped by contacting the stopper 19s with a shaft end 15e of the movable flange 15 protruding from a stepped portion 13e of the main shaft 13.

At that time, the stepped portion 13e of the main shaft 13 and the shaft end 15e of the movable flange 15 protruding therefrom cooperate to define a space K around the main shaft 13.

In connection with such structure, consider, for example, the case of assembling the ball spline 14, and mounting the snap ring 17 to fix it. Suppose that the length from the shaft end 15e of the movable flange 15 to the stepped portion 13e of the main shaft 13 is Lx, the drawing amount of the movable flange 15 is decreased by Lx, obtaining a reduction in the length L of the movable flange 15 as compared with the prior art movable flange shown in FIG. 1.

Particularly, in case that the length of the movable flange 15 is kept equal to the prior art movable flange, the number of the balls 14a of the ball spline 14 can be increased, which allows a dispersion of the load applied to a contact portion of the movable flange 15, resulting in an advantage in view of an improvement in the strength thereof.

Further, the protrusion 19p having one end integrated with the stopper 19s and the other end contacting the stepped portion 13e of the main shaft 13 is arranged in the space K defined by the stepped portion 13e of the main shaft 13, the shaft end 15e of the movable flange 15 protruding therefrom, and the stopper 19s, resulting in not only a reduction in the number of parts, but an easy positioning thereof upon assembling to the continuously variable transmission.

Furthermore, if a shim 29 for adjusting the length is inserted in the space K, a fine axial adjustment of parts is possible upon assembling to the continuously variable transmission.

In place of the shim, the other similar member may be used as the part to be arranged in the space K formed around the main shaft 13.

Figure 2:
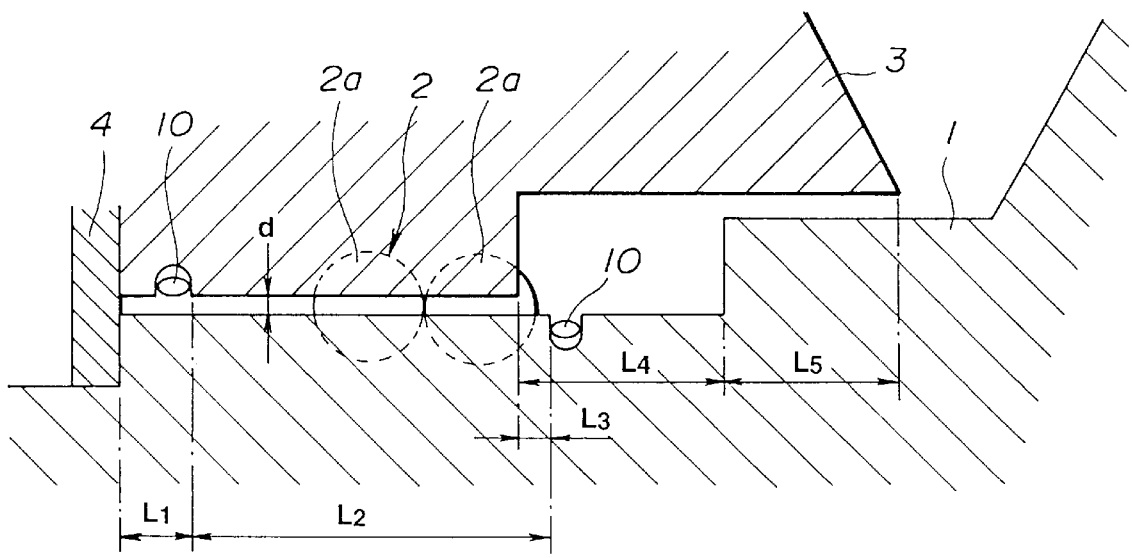
FIG. 2 is an enlarged section explaining the method of determining the minimum length L of a movable flange.

As for the space K, in order to prevent the snap rings 16, 17 from being disengaged from a clearance "d" between the main shaft 13 and the movable flange 15 (see FIG. 2), the clearance "d" is determined to be smaller than the diameter of a material wire of the snap rings 16, 17.

What is claimed is:

1. A continuously variable transmission, comprising:
   a main shaft having a stepped portion in the vicinity of an end thereof;
   a first flange integrated with said main shaft, said first flange having a first face;
   a second flange axially movably supported on said main shaft through a ball spline having balls, said second flange having a second face facing said first face of said first flange, an interval between said first face of said first flange and said second face of said second flange being changed by moving said second flange to achieve a continuous shifting;
   snap rings mounted to said main shaft and said second flange at an inner periphery thereof, respectively, said snap rings serving to prevent said ball spline from disengaging by restricting motion of said balls; and
   a stopper arranged on said main shaft at said end thereof, said stopper contacting an end of said second flange to prevent a movement thereof,
   wherein said stepped portion of said main shaft, said end of said second flange, and said stopper cooperates to define a space around said main shaft.

2. A continuously variable transmission as claimed in claim 1, wherein said stopper is integrated with a first cylinder member on a wall thereof which is vertical with respect to an axis of said main shaft.

3. A continuously variable transmission as claimed in claim 1, wherein a protrusion is arranged in said space, said protrusion having one end integrated with said stopper and the other end contacting said stepped portion of said main shaft.

4. A continuously variable transmission as claimed in claim 1, wherein a shim is arranged in said space to ensure an adjustment of length upon assembling.

* * * * *